(12) United States Patent
Roussie

(10) Patent No.: US 12,429,158 B2
(45) Date of Patent: Sep. 30, 2025

(54) HIGH STRENGTH INSULATED TUBE

(71) Applicant: VALLOUREC TUBE ALLOY, LLC, Houston, TX (US)

(72) Inventor: Gabriel Roussie, Meudon (FR)

(73) Assignee: VALLOUREC TUBE ALLOY, LLC, Houston, TX (US)

( * ) Notice: Subject to any disclaimer, the term of this patent is extended or adjusted under 35 U.S.C. 154(b) by 0 days.

(21) Appl. No.: 18/719,356

(22) PCT Filed: Dec. 12, 2022

(86) PCT No.: PCT/EP2022/085353
§ 371 (c)(1),
(2) Date: Jun. 13, 2024

(87) PCT Pub. No.: WO2023/110731
PCT Pub. Date: Jun. 22, 2023

(65) Prior Publication Data
US 2025/0052352 A1 Feb. 13, 2025

(30) Foreign Application Priority Data
Dec. 14, 2021 (EP) .................................... 21214448

(51) Int. Cl.
*F16L 39/00* (2006.01)
*F16L 13/02* (2006.01)
(Continued)

(52) U.S. Cl.
CPC ............ *F16L 39/005* (2013.01); *F16L 13/02* (2013.01); *F16L 15/001* (2013.01); *F16L 59/065* (2013.01)

(58) Field of Classification Search
CPC ..... F16L 9/18; F16L 13/0272; F16L 13/0263; F16L 13/02; F16L 13/0254; F16L 15/001;
(Continued)

(56) References Cited

U.S. PATENT DOCUMENTS 4,415,184 A * 11/1983 Stephenson ........... E21B 36/003
285/47
4,635,967 A * 1/1987 Stephenson ............. E21B 17/08
285/47
(Continued)

FOREIGN PATENT DOCUMENTS

DE 33 18 045 C1 12/1984
EP 0 474 530 A1 3/1992
JP 6-81033 A 3/1994

OTHER PUBLICATIONS

International Search Report & Written Opinion mailed on Feb. 16, 2023 in PCT/EP2022/085353 filed on Dec. 12, 2022 (citing references 1-2 & 15-17 therein, 9 pages).

*Primary Examiner* — Aaron M Dunwoody
(74) *Attorney, Agent, or Firm* — Oblon, McClelland, Maier & Neustadt, L.L.P.

(57) ABSTRACT

An insulated tube including a main body and an end piece, the end piece being attached to the main body, the main body having an inner tube and an outer tube, a radial gap being arranged between the inner tube and the outer tube, one between the outer tube and the inner tube being a cold hardened steel alloy tube, said cold hardened steel alloy tube having a first threaded portion and the end piece having a second threaded portion, the first threaded portion and the second threaded portion being screwed together such that the end piece is attached to the cold hardened steel tube in a sealed manner thanks to the cooperation between said first threaded portion and second threaded portion.

13 Claims, 2 Drawing Sheets

(51) Int. Cl.
*F16L 15/00* (2006.01)
*F16L 59/065* (2006.01)

(58) Field of Classification Search
CPC ....... F16L 39/005; F16L 59/06; F16L 59/065; F16L 59/075
See application file for complete search history.

(56) References Cited

U.S. PATENT DOCUMENTS

| | | | | |
|---|---|---|---|---|
| 5,393,109 | A * | 2/1995 | Gumpel | F16L 19/08 285/422 |
| 6,015,015 | A * | 1/2000 | Luft | E21B 17/1007 166/57 |
| 6,231,086 | B1 * | 5/2001 | Tierling | F16L 9/18 285/47 |
| 7,207,603 | B2 * | 4/2007 | Segreto | E21B 17/042 285/123.3 |
| 7,530,371 | B2 * | 5/2009 | Hickman | F16L 59/022 138/155 |
| 8,910,409 | B1 * | 12/2014 | Fonte | F41A 21/20 148/519 |
| 10,415,739 | B2 * | 9/2019 | Le Pennec | E21B 17/003 |
| 11,118,426 | B2 * | 9/2021 | Hargrave | E21B 17/04 |
| 11,761,306 | B2 * | 9/2023 | Roussie | F16L 57/005 285/47 |
| 2004/0178626 | A1 * | 9/2004 | Segreto | E21B 17/042 138/155 |
| 2012/0175007 | A1 * | 7/2012 | Pan | F16L 59/065 138/149 |
| 2018/0209565 | A1 * | 7/2018 | Lingnau | B23K 20/129 |
| 2018/0313471 | A1 * | 11/2018 | Debeaux | B32B 15/013 |
| 2019/0381594 | A1 * | 12/2019 | Kim | B23K 9/0026 |
| 2020/0114454 | A1 * | 4/2020 | Kim | F16L 13/02 |
| 2020/0393065 | A1 * | 12/2020 | Hargrave | E21B 17/04 |
| 2021/0310332 | A1 * | 10/2021 | Roussie | E21B 36/003 |
| 2022/0090708 | A1 * | 3/2022 | Roussie | E21B 36/003 |

* cited by examiner

HIGH STRENGTH INSULATED TUBE

TECHNICAL FIELD

The present invention relates to the field of insulated tubing for use in oil and gas wells, and especially to the field of vacuum insulated tubing for use in oil and gas wells.

TECHNOLOGICAL BACKGROUND

In the context of deepwater oil and gas wells, annular pressure buildup, hereafter named APB, is the pressure increase in the wellbore casing annulus caused by temperature changes in the wellbore during production. Document US 2020/0393065 describes a prior art deepwater oil and gas well including nested casings within a wellbore in a formation located below the seabed. The temperature increase in the wellbore casing annulus can result in pressure increases in the annulus that can in turn result in collapse of casing. Such collapse can cause the loss of the well.

Vacuum insulated tubing, hereafter named VIT, are used in such deepwater wells to mitigate APB in the annulus. A VIT is a tube-within-a-tube to be located in a deepwater well connected in-line to a production tubing such that production fluids flow through the VIT. The VIT has a vacuum gap there within between an inner tube and an outer tube of the VIT to reduce heat transfer from the production fluids within the inner tube into the annulus. The inner tube and the outer tube are joined in a sealed manner thanks to a weld between the respective ends of the inner tube and the outer tube.

As the inner tube and the outer tube are welded together, only low strength steels are used in known VIT. However, in some high pressure and high temperature wells, hereafter named HPHT wells which are defined as having a pressure greater than 130,42136 MPa (15,000 psi) or a temperature greater than 176.6° C. (350° F.), the pressure of the well can be so great that no known VIT can meet design requirements for high collapse strength.

Indeed, the low strength steel available for welding would require very high tubing walls in order to improve VIT strength, which would create clearance issues in the wells. This is particularly impactful on VIT construction where both the inner pipe and the outer pipe have to be rated for the absolute pressure (not just differential), internal for inners and external for outers.

Pipes using corrosive resistant alloy steel, hereafter named CRA steel, which are known for their high strength, are typically not upset since they require cold working to reach high strength. Indeed, welding cold hardened materials deteriorates performance in the heat affected zone. Thus, these CRA material are not adapted to known VIT in which the inner tube and the outer tube are welded together. Austenitic materials used in pipes are corrosive resistant and can be high strength qualified, but they require to be cold worked to be high strength qualified, which is not satisfactory as explained above. Martensitic materials used in pipes can be corrosive resistant and high strength but at lower levels than austenitic materials.

In fact, there is no existing high strength VIT solutions, best existing solutions being limited to steels in annealed conditions, with yield strength that are between 448159224 Pa (65 ksi) and 655001943 Pa (95 ksi).

A solution that has been considered in the past involves using precipitation hardening materials, which involves building the VIT and the weld in the annealed condition, and later heat treat the VIT altogether to create the final desired strength.

However, the aging process on precipitation hardening steels is rather long with typically around two days at elevated temperature. This requirement renders this solution unpractical with VIT. These drawbacks are leading to generally use non insulated solutions (non VIT) to APB challenges, even if VIT is recognized as the most reliable solution to prevent APB problems.

What is needed is a VIT capable of withstanding higher pressures than known VIT are capable of withstanding such as those pressures encountered in HPHT deepwater wells without collapsing and without losing vacuum.

SUMMARY

One idea on which the invention is based is to provide an insulated tube, especially a vacuum insulated tube, capable of withstanding higher pressures than known VIT are capable of withstanding such as those pressures encountered in HPHT deepwater wells without collapsing and without losing vacuum.

In order to provide such insulated tube, the invention provides an insulated tube comprising a main body and an end piece, the end piece being attached to the main body, the main body comprising an inner tube and an outer tube, the inner tube and the outer tube being separated by a radial gap, one between the outer tube and the inner tube being a cold hardened steel alloy tube, said cold hardened steel alloy tube having a first threaded portion and the end piece having a second threaded portion, the first threaded portion and the second threaded portion being screwed together such that the end piece is attached to the cold hardened steel tube in a sealed manner thanks to the cooperation between said first threaded portion and second threaded portion.

Thanks to these features, the insulated tube has a good tension and compression behavior. For instance, such an insulated tube can have a yield strength about 861844662 Pa (125 ksi) or more thanks to the cold hardened steel alloy tube threaded with the end piece while insulation, for instance vacuum, is maintained between the inner tube and the outer tube in the radial gap. Especially, such an insulated tube can be manufactured with a high strength corrosive resistant alloy, typically a cold hardened steel alloy tube having a yield strength above 861844662 Pa (125 ksi).

Moreover, such an insulated tube can be manufactured with any further thread on the side of the end piece opposed to the main body in order to be joined to another tube in the well. Such another tube in the well can be, for instance, another vacuum insulated tube or others kind of tubes used in the well. Thus, this end piece allows for the vacuum insulating tube to be manufactured with a further thread for joining to another tube with a good resistance capability regardless of the main body, inner tube or outer tube, resistance capability.

Such a vacuum insulated tube may comprise one or more of the following features.

According to an embodiment, the other tube between the outer tube and the inner tube is an heat treated steel alloy tube, According to an embodiment, the other tube between the outer tube and the inner tube is welded on the end piece such that the end piece is attached to said other tube in a sealed manner thanks to said welding.

According to an embodiment, heat insulation is arranged between the inner tube and the outer tube in the radial gap. According to an embodiment, vacuum is arranged between the inner tube and the outer tube, for instance the heat insulation arranged between could be vacuum, the insulated tube being a vacuumed insulated tube.

Thanks to both the threaded joint between the cold hardened steel alloy tube and the end piece and the welding between the other tube and the end piece, the radial gap between the inner tube and the outer tube is sealed and can preserve the insulations properties of the insulating tube, for instance by maintaining the vacuum in said radial gap.

According to an embodiment, the inner tube and the outer tube are coaxial. Preferably, the insulated tube has a longitudinal axis, the inner tube and the outer tube being coaxial with said longitudinal axis of the insulated tube.

According to an embodiment, the end piece comprises a first end portion and a second end portion. According to an embodiment, the first end portion comprises the second threaded portion. According to an embodiment, the second end portion comprises, on an inner peripheral surface or an outer peripheral surface of said second end portion, a third threaded portion. Such a third threaded portion allows the insulated tube to be joined to another tube in the well, for instance another vacuum insulated tube.

According to an embodiment, the end piece comprises a first end portion, a second end portion and a central portion, the central portion axially joining the first end portion and the second end portion. Preferably, the central portion has a radial thickness greater than a radial thickness of the first end portion. Preferably, the radial thickness of the central portion is greater than a radial thickness of the second end portion. Preferably, the other tube between the inner tube and the outer tube is welded on the central portion of the end piece.

Thanks to these features, the welding between said tube and the end piece is arranged in a portion of said end piece having a thickness large enough to avoid weakness resulting from the welding process. In other words, such a weldable end piece allows welding where it does not impact the insulated tube resistance.

According to an embodiment, the second threaded portion is arranged on an inner peripheral surface of the end piece, the first threaded portion being arranged on an outer peripheral surface of the cold hardened steel alloy tube. According to an embodiment, the second threaded portion is arranged on an outer peripheral surface of the end piece, the first threaded portion being arranged on an inner peripheral surface of the cold hardened steel alloy tube.

According to an embodiment, at least one of the first threaded portion and the second threaded portion, and preferably both the first threaded portion and the second threaded portion, comprises a thread sealing surface treatment.

Such a sealing surface treatment provides a good sealability to the junction between the first threaded portion and the second threaded portion, maintaining efficiently the vacuum between the inner tube and the outer tube.

Such sealing surface treatment can be made using different sealing surface treatments. According to an embodiment, the sealing surface treatment comprise lubricant applied on at least one of the first threaded portion and the second threaded portion. According to an embodiment, the sealing surface treatment comprises a copper plating surface treatment. According to an embodiment, the sealing surface treatment comprises a Nickel plating surface treatment.

According to an embodiment, the cold hardened steel alloy tube comprises a first shoulder, the end piece comprising a second shoulder, the first shoulder and the second shoulder being in contact in a screwed state of the first threaded portion and the second threaded portion. According to an embodiment, at least one between the first shoulder and the second shoulder, and preferably both the first shoulder and the second shoulder, comprises a shoulder sealing surface treatment.

According to an embodiment, the shoulder sealing surface treatment comprises a strip of high temperature brazing material, said strip of high temperature brazing material being mechanically squeezed between the first shoulder and the second shoulder in the screwed state of the first threaded portion and the second threaded portion.

According to an embodiment, the insulated tube further comprises a groove arranged on at least one of the cold hardened steel alloy tube or the end piece, the insulated tube further comprising a strip of high temperature brazing material arranged in said groove. Preferably, said strip of high temperature brazing material is mechanically squeezed between the cold hardened steel alloy tube and the end piece in the screwed state of the first threaded portion and the second threaded portion. According to an embodiment, the groove is arranged on the cold hardened steel alloy tube axially between the first shoulder and the first threaded portion. According to an embodiment, the groove is arranged on the end piece axially between the second shoulder and the second threaded portion.

According to an embodiment, the inner tube is a clad pipe comprising a main inner pipe and an inner layer, the main inner pipe comprising martensitic corrosive resistant steel alloy, the inner layer being in an austenitic corrosive resistant alloy. Such an inner layer ensures the inner corrosive resistance of the insulated tube.

According to an embodiment, an end of the main inner pipe is welded to the outer tube. In this embodiment, the mechanical resistance of the insulated tube is ensured thanks to the cooperation between the first threaded portion and the second threaded portion, locally welding the main inner pipe therefore does not weak said insulated tube as the inner tube has fewer mechanical constraints.

According to an embodiment, the cold hardened steel alloy tube is made of an austenitic corrosive resistant alloy.

According to an embodiment, the other tube between the inner tube and the outer tube is an heated treated steel alloy tube made of martensitic corrosive resistant steel alloy.

According to an embodiment, the end piece is made of low strength corrosive resistant alloy.

According to an embodiment, the end piece is made of annealed steel alloy.

According to an embodiment, the outer tube is the cold hardened steel alloy tube and the inner tube is an heat treated steel alloy tube.

According to an embodiment, the inner tube is the cold hardened steel alloy tube and the outer tube is an heat treated steel alloy tube.

BRIEF FIGURES DESCRIPTION

The invention will be better understood, and other objects, details, features and advantages thereof will become more clearly apparent during the course of the following description of a number of particular embodiments of the invention which are given solely by way of nonlimiting illustration with reference to the appended drawings.

DETAILED DESCRIPTION

Figure 1:
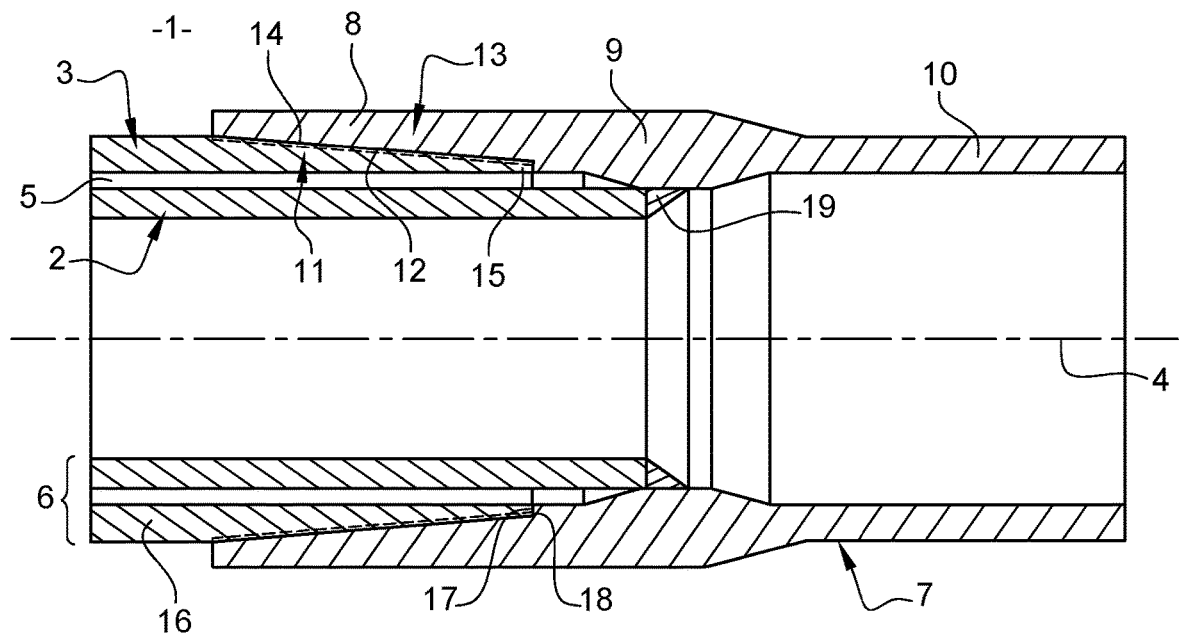
FIG. 1 is a schematic cross-sectional view along a longitudinal axis X of an end portion of a vacuum insulated tube according to a first embodiment of the invention.

FIG. 1 shows an end portion of a vacuum insulated tube 1, hereafter named VIT 1. Such a VIT 1 comprises an inner tube 2 and an outer tube 3. The inner tube 2 and the outer tube 3 are coaxially arranged along a longitudinal axis 4 of the VIT 1. The outer tube 3 has an internal diameter greater than an outside diameter of the inner tube 2 such that a radial gap 5 is present along the longitudinal axis 4 between the inner tube 2 and the outer tube 3. The outer tube 3 and the inner tube 2 define together a main body 6 of the VIT 1.

The VIT 1 further comprises an end piece 7. This end piece 7 comprises a first end portion 8, a central portion 9 and a second end portion 10. The central portion 9 is arranged between the first end portion 8 and the second end portion 10 along the longitudinal axis 4. The end portion 7 is joined to the main body 6 of the VIT 1. Especially, as explained below, the end piece 7 is joined in a sealed manner both to the inner tube 2 and the outer tube 3 in order to preserve the vacuum in the radial gap 5.

In the embodiment shown on FIG. 1, an end of the outer tube 3 comprises a male portion 11. This male portion 11 comprises a first threaded portion 12. Moreover, the first end portion 8 of the end piece 7 comprises a female portion 13, said female portion 13 comprising a second threaded portion 14. The outer tube 3 and the end piece 7 are joined in a sealed manner thanks to the cooperation between the first threaded portion 12 and the second threaded portion 14. In other words, the first threaded portion 12 is screwed in the second threaded portion 14 in order to join in a sealed manner the outer tube 3 and the end piece 7.

The male portion 11 and the female portion 13 can be of any known type ensuring good sealability and resistance between the end piece 7 and the outer tube 3. For instance, the male portion 11 and the female portion 13 can have, respectively, a first sealing surface and a second sealing surface which, when the first threaded portion 12 and the second threaded portion 14 are screwed together in a made-up state, cooperate with metal-to-metal interference to ensure sealability of the joint formed thanks to the cooperation between the male portion 11 and the female portion 13.

The male portion 11 further comprises a lip 15 forming the free end of the male portion 11 at the end of the outer tube 3. The first threaded portion 12 is axially arranged between a body 16 of the outer tube 3 and the lip 15. A radial surface at the free end of this lip 15 forms a first torque shoulder 17. This first torque shoulder 17 extends mainly in the radial direction, said radial direction being perpendicular to the longitudinal axis 4. The end piece 7 comprises a second torque shoulder 18 extending mainly in the radial direction. The first torque shoulder 17 and the second torque shoulder 18 are in contact in the made-up state of the first threaded portion 12 and the second threaded portion 14. These first torque shoulder 17 and second torque shoulder 18 ensure the axial positioning in the made-up state of the first threaded portion 12 and the second threaded portion 14 when they are screwed together.

In order to ensure better sealing behavior between the outer tube 3 and the end piece 7, the first threaded portion 12 and/or the second threaded portion 14 comprise a surface treatment. In an embodiment, this surface treatment is made of lubricant applied on the first threaded portion 12 and/or on the second threaded portion 14. Such a lubricant is for instance Vacuum grease. Other surface treatments could be used, for instance a copper plating surface treatment or a Nickel plating surface treatment.

In an embodiment, the contact between the first torque shoulder 17 and the second torque shoulder 18 can also ensure sealability of the joint between the outer tube 3 and the end piece 7, for instance thanks to a metal-to-metal interference. The sealability of the joint between the outer tube 3 and the end piece 7 can also be improved thanks to a surface treatment on at least one of the torque shoulders 17, 18. This surface treatment is preferably based on high temperature non evaporable compounds, typically metallic compounds.

Figure 3:
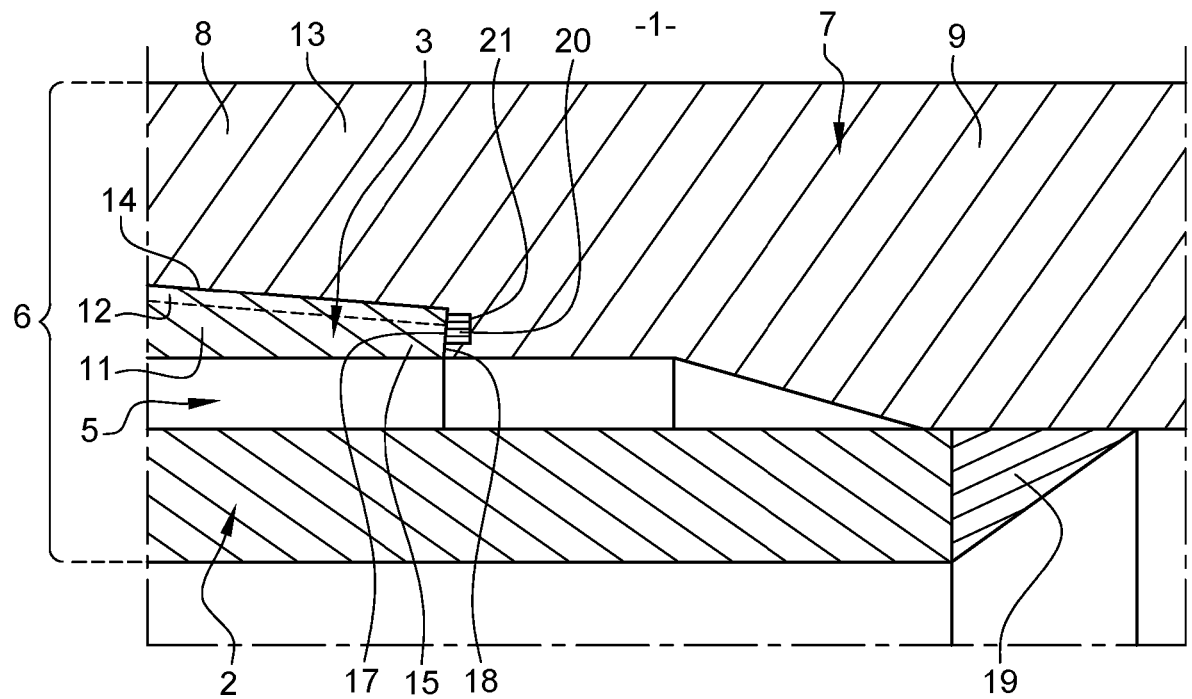
FIG. 3 is a detailed view of an embodiment of the vacuum insulated of FIG. 1 comprising a groove and a brazing material arranged in said groove.

In an embodiment, the surface treatment on the torque shoulders 17, 18 comprises on at least one of the first torque shoulder 17 and the second torque shoulder 18 a continuous strip of high temperature brazing material 20 (see FIG. 3) that is mechanically squeezed between the first torque shoulder 17 and the second torque shoulder 18 in the made-up state of the first threaded portion 12 and second threaded portion 14. Such a strip of high temperature brazing material 20 can be directly applied on at least one of the torque shoulders 17, 18, preferably all around the circumference of the corresponding torque shoulder 17 or 18. The thickness of that strip of high temperature brazing material is such that it does not modify the seal engagement of the first threaded portion 12 with the second threaded portion 14 or the sealing surfaces.

In another embodiment, the strip of high temperature brazing material 20 is arranged in a circumferential groove 21, said circumferential groove 21 being located on one of the torque shoulders 17 or 18. Such a strip of high temperature brazing material 20 is preferably arranged in the groove 21 before threading the first threaded portion 12 and/or the second threaded portion 14 for better compliance with the manufacturing tolerances. As shown on FIG. 3 for instance, the groove 21 is arranged on the second torque shoulder 18 with the strip of high temperature brazing material 20 arranged in said groove 21. However, the groove 21 and the strip of high temperature brazing material 20 could be on the first torque shoulder 17.

In another embodiment, a surface of the male portion 11 between the first torque shoulder 17 and the first threaded portion 12 and/or a surface of the female portion 13 between the second threaded portion 14 and the second torque shoulder 18 can also have a high temperature brazing material strip 20. This strip of high temperature brazing material 20 can be, for instance, arranged in a circumferential groove 21 managed on the surface of the male portion 11 between the first torque shoulder 17 and the first threaded portion 12 and/or a surface of the female portion 13 between the second threaded portion 14 and the second torque shoulder 18. Such a strip of high temperature brazing material further improves the seal behavior of the joint between the outer tube 3 and the end piece 7.

As the outer tube 3 and the end piece 7 are joined in a sealed manner thanks to the cooperation between the male portion 11 and the female portion 13, the outer tube 3 of the VIT 1 can be made of high strength corrosive resistant alloy, for instance having a yield strength of 861844662 Pa (125 ksi) or above. For instance, such an outer tube 3 can be made of any cold hardened corrosive resistant alloy, which requires cold working to reach high strength and specific yield strength. The outer tube 3 is for instance made of an austenitic corrosive resistant alloy.

Thanks to the cooperation between the male portion 11 and the female portion 13, no welding which could deteriorates the performances of the joint involving a cold hardened steel alloy is required for joining in a sealed manner the outer tube 3 and the end piece 7.

Thus, thanks to the invention, it is possible to manufacture VIT 1 having full strength (tension and pressure) capability using a high strength main body 6 comprising an outer tube 3 made of cold hardened steel alloy.

The end piece 7 and the inner tube 2 are joined in a sealed manner thanks to a weld 19 between an end of the inner tube 2 and the central portion 9 of the end piece 7. As the mechanical resistance of the VIT 1 is ensured thanks to the outer tube 3 having high strength joined to the end piece 7 using male portion 11 and female portion 13, this weld 19 does not weak the VIT 1.

The end piece 7 is preferably made of weldable low strength corrosive resistant alloy material. The end piece 7 is for instance in annealed condition.

The inner tube 2 does not need to be a high strength corrosive resistant alloy tube as it is not structural to the string of tubes in the well. Indeed, the inner tube 2 needs to withstand the pressure and needs to withstand corrosion from the fluids on its inside. The inner tube 2 can for instance be made of heat-treated steel alloy to aim a specific yield strength. This inner tube 2 is therefore not cold hardened in order to be weldable on the end piece 7, which is also in a weldable material. For instance, the inner tube 2 is made of martensitic steel alloy.

The central portion 9 has a greater radial thickness than the radial thickness of both the first end portion 8 and the second end portion 10. The inner tube 2 is welded to the central portion 9 of the end piece 7 thanks to the weld 19. This weld 19 is circumferential around the inner surface of the central portion 9 to provide sealing between the inner tube 2 and the end piece 7. As the central portion 9 has an increased radial thickness, the weld 19 does not create a weakness in the junction between the end piece 7 and the inner tube 2 nor in the end piece 7. The second end portion 10 of the end piece 7 can be threaded with any thread, this thread being the field thread for joining the VIT 1 with another vacuum insulated tube or casing tube in the well.

Such a weldable end piece 7 and the weldable inner tube 2 allows welding where it matters while the high strength outer tube 3 provide high strength without requiring to increase thickness of said outer tube 3 and preserving the radial gap 5 as a vacuum space.

A typically solution to save on manufacturing cost of the inner tube 2 would be a clad pipe as inner tube 2. Such a clad pipe inner tube 2 would be made mostly of SS resistant Carbon steel such as SS-125 grade, with a thin portion of austenitic internally clad CRA pipe. The ends of that pipe would be filet welded to the outer pipe 3, creating a continuous layer or martensitic CRA material.

Only one end of the VIT 1 is shown on FIG. 1, however both ends of such a VIT 1 can be manufactured with the above-described features. However, in order to allow for inner tube 2 insertion, one end of the VIT 1 might be assembled before insertion of the inner tube 2, and the other end after insertion of the inner tube 2.

A vacuum insulated tube as described in view of FIG. 1 enables the use of high strength tubulars component, typically for the outer tube, which are not limited to 448159224-655001943 Pa (65-95 ksi) yield strength tubulars components and can be made of tubulars components having a yield strength of 861844662 Pa (125 ksi) and more.

In the embodiment shown on FIG. 1, the first threaded portion 12 is arranged on a radially outer surface of the end of the outer tube 3 and the second threaded portion 14 is arranged on a radially inner surface of the first end 8 of the end piece 7. However, in a not shown embodiment, the first threaded portion 12 is arranged on a radially inner surface of the end of the outer tube 3 and the second threaded portion 14 is arranged on a radially inner surface of the first end 8 of the end piece 7. In other words, the male portion 11 could be arranged on the end piece 7 and the female portion 13 could be arranged on the outer tube 3.

Figure 2:
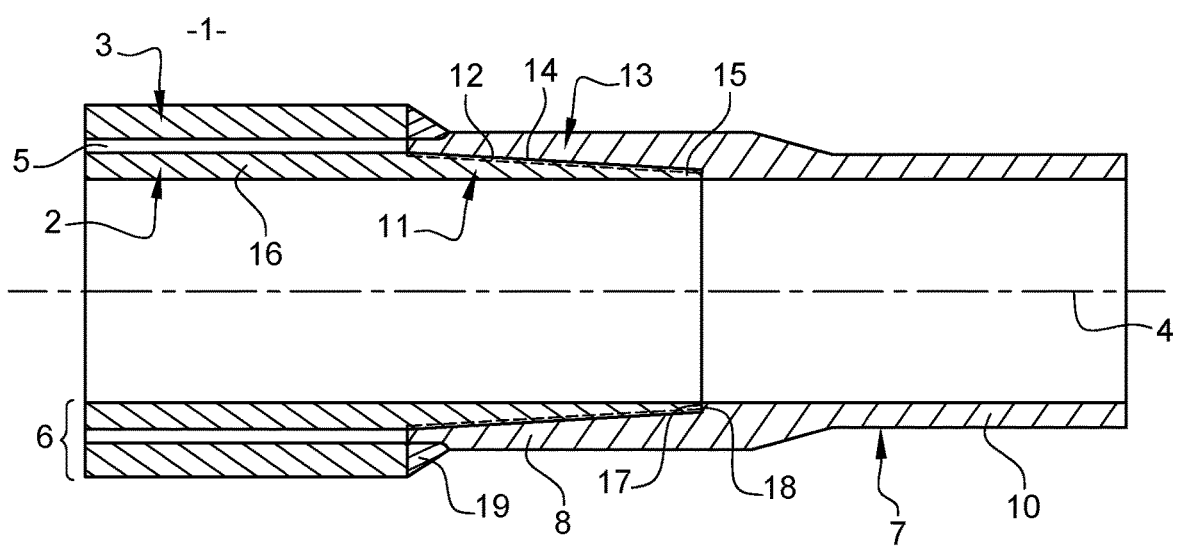
FIG. 2 is a schematic cross-sectional view along a longitudinal axis X of an end portion of a vacuum insulated tube according to a second embodiment of the invention.

FIG. 2 is a schematic view of an end portion of a vacuum insulated tube according to a second embodiment of the invention. In this second embodiment, identical features or features having the same function as described above in view of FIG. 1 have the same reference.

The second embodiment shown on FIG. 2 differs from the first embodiment shown on FIG. 1 in that the outer tube 3 is welded to the end piece 7 while the inner tube 2 is joined to the end piece 7 thanks to threaded portions 12 and 14. In other words, the features of the inner tube 2 and the features of the outer tube 3 are switched between the first embodiment and the second embodiment, the inner tube 2 in the second embodiment comprising the features of the outer tube 3 as described in view of the first embodiment while the outer tube 3 in this second embodiment comprises the features of the inner tube 2 as described in view of the first embodiment.

Therefore, in this second embodiment, the inner tube 2 is made of a cold hardened corrosive resistant alloy having high strength properties. The end of this inner tube 2 comprises the male portion 11 with the first threaded portion 12 which is screwed with the second threaded portion 14 of the female portion 13 arranged on the end piece 7. The outer tube 3 is made of heat treated steel alloy. Contrary to the first embodiment, the weld 19 between the outer tube 3 and the end piece 7 is made at the free end of the first end portion 8 of the end piece 7, said end piece 7 being made of weldable low corrosive resistant steel alloy. Thus, the central portion 9 of the end piece 7 does not require to have an increased thickness.

Figure 4:
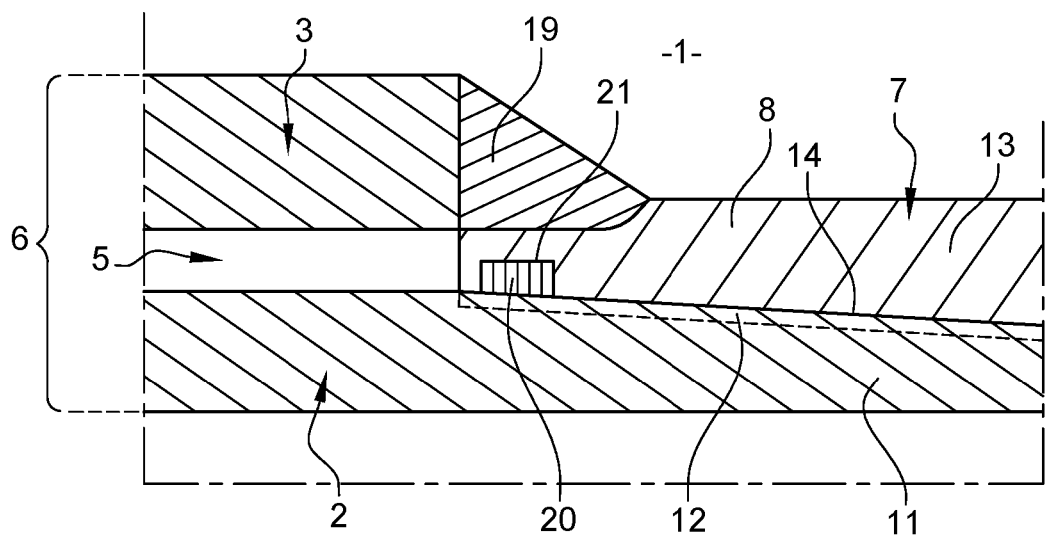
FIG. 4 is a detailed view of an embodiment of the vacuum insulated of FIG. 2 comprising a groove and a brazing material arranged in said groove.

In this second embodiment, a groove 21 as described above an be arranged on the end piece 7, for instance at the end of the second threaded portion 14 as shown on FIG. 4 or on the side of the first threaded portion 12 opposed to the end of said inner tube 2, and a strip of high temperature brazing material 20 can be arranged in said groove 21 to ensure sealability of the joint between the inner tube 2 and the end piece 7.

Although the invention has been described in conjunction with a number of particular modes of embodiment, it is quite obvious that it is not in any way restricted thereto and that it comprises all the technical equivalents of the means described and combinations thereof where these fall within the scope of the invention as defined by the claims.

The use of the verbs "comprise", "have" or "include" and conjugated forms thereof does not exclude there being elements or steps other than those listed in a claim.

In the claims, any reference sign between parentheses should not be interpreted as placing a limit on the claim.

The invention claimed is:

1. An insulated tube comprising:
   a main body; and
   an end piece, the end piece being attached to the main body, wherein the main body includes an inner tube and an outer tube, the inner tube and the outer tube being separated by a radial gap, wherein one tube, between the outer tube and the inner tube, is a cold hardened steel alloy tube, said cold hardened steel alloy tube having a first threaded portion and the end piece having a second threaded portion, and wherein the first threaded portion and the second threaded portion are configured to be screwed together such that the end piece is attached to the cold hardened steel tube in a sealed manner due to the cooperation between said first threaded portion and second threaded portion.

2. An insulated tube according to claim 1, wherein an other tube, between the inner tube and the outer tube, is a heat treated steel alloy tube.

3. An insulated tube according to claim 1, wherein an other tube, between the outer tube and the inner tube, is welded on the end piece such that the end piece is attached to said other tube in a sealed manner due to said welding.

4. An insulated tube according to claim 1, wherein vacuum insulation is arranged between the inner tube and an outer tube in the radial gap.

5. An insulated tube according to claim 1, wherein vacuum is arranged between the inner tube and the outer tube.

6. An insulated tube according to claim 1, wherein the end piece comprises a first end portion, a second end portion and a central portion, the central portion axially joining the first end portion and the second end portion, the central portion having a radial thickness greater than a radial thickness of the first end portion, the radial thickness of the central portion being greater than a radial thickness of the second end portion, an other tube between the inner tube and the outer tube being welded on the central portion of the end piece, the first end portion comprising the second threaded portion.

7. An insulated tube according to claim 1, wherein at least one of the first threaded portion and the second threaded portion comprises a thread sealing surface treatment.

8. An insulated tube according to claim 1, wherein the cold hardened steel alloy tube comprises a first shoulder, the end piece comprising a second shoulder, the first shoulder and the second shoulder being in contact in a screwed state of the first threaded portion and the second threaded portion, and wherein at least one between the first shoulder) and the second shoulder comprises a shoulder sealing surface treatment.

9. An insulated tube according to claim 8, wherein the shoulder sealing surface treatment comprises a strip of high temperature brazing material, said strip being mechanically squeezed between the first shoulder and the second shoulder in the screwed state of the first threaded portion and the second threaded portion.

10. An insulated tube according to claim 1, further comprising a groove arranged on at least one of the cold hardened steel alloy tube or the end piece, the insulated tube further comprising a strip of high temperature brazing material arranged in said groove.

11. An insulated tube according to claim 1, wherein the cold hardened steel alloy tube is made of an austenitic corrosive resistant alloy.

12. An insulated tube according to claim 1, wherein an other tube between the inner tube and the outer tube is made of martensitic corrosive resistant steel alloy.

13. An insulated tube according to claim 1, wherein the end piece is made of low strength corrosive resistant alloy.

* * * * *